Patented Apr. 9, 1940

2,196,577

UNITED STATES PATENT OFFICE 2,196,577

PROCESS FOR FORMING PLASTIC SHEET STOCK

Lauchlin M. Currie, Lakewood, and Leon K. Merrill, Berea, Ohio, assignors to Carbide and Carbon Chemicals Corporation, a corporation of New York No Drawing. Application June 18, 1937, Serial No. 148,958

6 Claims. (Cl. 18—57)

This invention relates to improvements in methods of manufacturing sheet stock from thermoplastic resins, and more particularly to the fabrication of homogeneous sheets of any desired thickness.

The usual method for producing sheet stock from thermoplastic resins is accomplished by such operations as shaving thin slices from a block of resin, extruding the plastic mass through a slot, casting the resin in liquid form upon a flat surface and allowing it to harden, or calendering the mass between rollers. In all of these methods the labor is tedious, and it is both difficult and costly to produce thick sheet stock having the homogeneity requisite for uniform and maximum strength, or, in addition, good clarity where the articles fabricated must be transparent. This is due primarily to the almost unavoidable presence of bubbles in the plastic mass. Furthermore, it is necessary to polish the surfaces of the sheet stock to obtain a perfectly smooth product, and this is usually accomplished by the additional operation of pressing the sheet between highly polished, heated planishing plates in a hydraulic press, which, of course, causes the resin to extrude around the edges, thus reducing the thickness of the sheet stock and causing waste. Since the planishing plates must remain smooth and flat under considerable pressure, they are nearly always made of expensive steel (usually stainless) brightly polished and chromium plated.

These difficulties are particularly notable in the production of sheet stock from the vinyl resins, such as the polystyrene resins, polymerized vinyl esters, conjoint polymers of vinyl halides with vinyl esters of fatty acids, mixtures of polyvinyl chloride and the conjoint polymers of vinyl halides with vinyl esters, and partial or complete reaction products of polyvinyl alcohol with aldehydes, or mixed acetal-ester resins, and the like, and the method to be described is particuarly applicable to the fabrication of sheet stock having excellent clarity and strength and of any desired thickness, from these resins. However this process may be applied equally well to the production of sheet stock from other thermoplastic resins, such as the cellulose plastics. Furthermore, in the process itself, the expensive steel planishing plates may be replaced with cheaper, fragile materials, such as glass or porcelain, and the tendency for edge extrusion of the plastic mass is eliminated.

The process of this invention consists in reducing the plastic mass to a very thin sheet or film by any of the usual methods, such as calendering or shaving, and compositing a plurality of these films under pressure to form the sheet stock of the desired thickness. By this means trapped air and gases which may appear in the original plastic mass are eliminated and the resulting product is exceptionally free from flaws.

Although the lamination of the several thin films to form the homogeneous thick one may be conveniently performed in a multi-platen hydraulic press having cored platens for heating and cooling, this procedure is very laborious due to the extremely poor conditions for heat transfer and the inherent difficulties involved in obtaining uniform distribution of the high laminating pressure required. The preferred method is to place a plurality of thinly calendered plastic films between planishing plates, made of any rigid material (polished or not), and then to mount the sandwich thus formed in an autoclave or similar pressure vessel where heat and pressure are applied through a fluid medium directly in contact with the planishing plates. Any fluid may be chosen for this purpose, although liquids which are nonsolvents for the resin at the temperature employed are the most satisfactory. In particular, employment of a liquid which will not adhere by capillary action, or "wet" the resin, such as mercury, facilitates assembly of the sandwich and compositing of the films for the reason that no precautions need be taken to prevent edge infiltration of the liquid into the assembly of resin sheets. On the other hand, if oil or water, or some liquid which does wet the surface of the resin is used, there is some edge infiltration, but it is so slight as to permit elimination from the sheet by trimming the imperfect edges after removal of the sheet from the autoclave. When employing the latter liquids it is often desirable to effect a precompression of the sandwich in a mechanical or hydraulic press, with or without evacuation to remove entrapped air, and to maintain sufficient laminating pressure on the pressed assembly by means of clamps or otherwise to inhibit material penetration by the fluid before the bonding action starts. If desired, the sandwich may be edge sealed with a strip of rubber or other material, but the process is equally efficacious with or without edge sealing.

If resins are used which adhere to the material of the planishing plates, some release agent, such as oil, wax, or a metal stearate, is used either in the resin itself or on the surfaces of the planishing plates.

The conditions of temperature, pressure and time of laminating will vary with the equipment used and the resin from which the sheet stock is being made. However, best results are obtained when using (1) high pressure on the sandwich at relatively low temperature, (2) a gradual decrease of that pressure and increase of temperature to cause bonding of the films, and (3) maintenance of sufficient pressure during cooling to prevent separation until solidification of the resin occurs.

The following example is a typical application of this invention:

A vinyl resin made by the conjoint polymerization of vinyl chloride and vinyl acetate, containing between 75% and 90% vinyl chloride in the polymer, and containing 1% of lead stearate and 1% of carnauba wax, was calendered to a thickness of 0.01 inch. This film was cut into 10 sections 6 inches square, and these sections were assembled between glass plates 6 inches square. Rubber bands were placed around the assembly to hold the sandwich together during handling. The sandwich was placed in an autoclave, hot water introduced to cover the sandwich, and nitrogen gas pressure applied to the water. When the autoclave was heated to about 105° C. the pressure was raised to about 305 pounds per square inch. During a period of 25 minutes the temperature was raised to 140° C. and the pressure gradually dropped to 100 pounds per square inch. The pressure and temperature were held at this point for another 20 minutes, the autoclave cooled to 40° C., the pressure released, and the sandwich removed. The films were united in a homogeneous sheet 0.1 inch thick which was free from ripples and striations, and which possessed highly polished surfaces.

The conditions of pressure, temperature and time of compression will obviously depend upon the size and type of equipment employed, together with the means of handling the fluid medium for heat transfer and pressure application. However, laminating pressures within the broad range of 50 to 500 pounds per square inch will be found most suitable.

The foregoing description is given by way of illustration and many modifications of the process may be made within the scope of the invention as defined by the appended claims.

We claim:

1. Process of forming sheet stock of a vinyl resin, said stock being homogeneous, of uniform strength and free from bubbles or entrapped gases, which comprises reducing the vinyl resin mass to very thin films, interposing a plurality of said films between plane supports and subjecting the sandwich thus made to fluid pressure, reducing the pressure over a period of time and simultaneously raising the temperature, maintaining the reduced pressure and raised temperature for a further period of time, reducing said temperature and thereafter reducing said pressure to atmospheric.

2. Process of forming plastic sheet stock of a vinyl ester resin, said stock being homogeneous, of uniform strength and free from bubbles or entrapped gases, which comprises reducing the vinyl resin mass to very thin films, interposing a plurality of said films between plane supports and subjecting the sandwich thus made to fluid pressure between 50 and 500 pounds per square inch, reducing said pressure over a period of time and simultaneously raising the temperature to the softening temperature of the vinyl resin, maintaining the reduced pressure and raised temperature for a further period of time, reducing said temperature well below the softening temperature of the vinyl resin, and thereafter reducing said pressure to atmospheric.

3. Process of forming sheet stock of a vinyl ester resin, which comprises interposing a plurality of thin sheets between plane supports and subjecting the whole to fluid pressure between 50 and 500 pounds per square inch, heating the sandwich initially to a temperature of 100° C., reducing the pressure over a period of time and simultaneously raising the temperature to the softening point of the resin, maintaining the reduced pressure and raised temperature for a further period of time, reducing said temperature well below the softening temperature of the vinyl resin, and thereafter reducing said pressure to atmospheric.

4. Process of forming sheet stock of a vinyl ester resin, which comprises interposing a plurality of thin sheets between plane supports and subjecting the whole to fluid pressure between 100 and 350 pounds per square inch, heating the sandwich initially to a temperature of 100° C., reducing the pressure over a period of time and simultaneously raising the temperature to 140° C., maintaining the reduced pressure and raised temperature for a further period of time, reducing said temperature well below the softening temperature of the vinyl resin, and thereafter reducing said pressure to atmospheric.

5. Process of forming sheet stock of a vinyl resin made by the conjoint polymerization of vinyl chloride and vinyl acetate, containing between 75% and 90% vinyl chloride in the polymer, which comprises interposing a plurality of thin films of said resin between plane supports and subjecting the sandwich thus made to a fluid pressure of about 325 pounds per square inch at a temperature of about 105° C., reducing said pressure to about 100 pounds per square inch over a period of time and simultaneously raising said temperature to about 140° C., maintaining the pressure at about 100 pounds per square inch and the temperature at about 140° C. for a further period of time, reducing said temperature to about 40° C. and thereafter reducing said pressure to atmospheric.

6. Process of forming sheet stock of a vinyl resin made by the conjoint polymerization of vinyl chloride and vinyl acetate, containing between 75% and 90% vinyl chloride in the polymer, which comprises interposing a plurality of thin films of said resin between plane supports and subjecting the sandwich thus made to a fluid pressure of about 325 pounds per square inch at a temperature of about 105° C., reducing said pressure to about 100 pounds per square inch over a period of about 20 minutes and simultaneously raising said temperature to about 140° C., maintaining the pressure at about 100 pounds per square inch and the temperature at about 140° C. for a further 20 minutes, reducing said temperature to about 40° C. and thereafter reducing said pressure to atmospheric.

LAUCHLIN M. CURRIE.
LEON K. MERRILL.